United States Patent [19]
Fowler et al.

[11] Patent Number: 5,913,643
[45] Date of Patent: Jun. 22, 1999

[54] ADJUSTABLE LEAD ANGLE CHAMFERING TOOLHOLDER

[75] Inventors: Jeremy L. Fowler, Hickory; Craig S. Adcock, Knightdale; Jeffrey E. Hartshorn; Scott W. Vogel, both of Raleigh, all of N.C.

[73] Assignee: Kennametal Inc., Latrobe, Pa.

[21] Appl. No.: 08/844,867

[22] Filed: Apr. 22, 1997

[51] Int. Cl.⁶ .................................................. B23B 27/16
[52] U.S. Cl. ................................ 407/36; 407/39; 407/90
[58] Field of Search .................... 407/40, 44, 46, 407/36, 34, 53, 90; 408/188, 187, 713

[56] References Cited

U.S. PATENT DOCUMENTS

| | | | |
|---|---|---|---|
| 1,219,097 | 3/1917 | Gibbs | 408/188 |
| 1,410,714 | 3/1922 | Ostermann . | |
| 3,546,759 | 12/1970 | Sirola | 407/90 |
| 4,097,181 | 6/1978 | Fisher | 408/187 |
| 4,470,731 | 9/1984 | Erkfritz | 407/38 |
| 4,692,069 | 9/1987 | Erkfritz | 407/38 |
| 4,780,029 | 10/1988 | Beck | 407/90 |
| 4,848,977 | 7/1989 | Kieninger | 407/39 |
| 4,876,932 | 10/1989 | Nessel | 407/90 |
| 4,927,301 | 5/1990 | Reiterman | 408/180 |
| 5,102,268 | 4/1992 | Mitchell | 407/36 |
| 5,123,787 | 6/1992 | Hunt | 407/39 |
| 5,156,501 | 10/1992 | Pawlik et al. | 407/36 |
| 5,259,707 | 11/1993 | Keller | 407/40 |
| 5,336,026 | 8/1994 | Noggle | 408/147 |

FOREIGN PATENT DOCUMENTS

| | | |
|---|---|---|
| 0282090 | 9/1998 | European Pat. Off. . |
| 3303058 | 8/1984 | Germany . |
| 4436779 | 4/1996 | Germany . |
| 1042062 | 9/1966 | United Kingdom . |

OTHER PUBLICATIONS

International Search Report for Application No. PCT/US98/06886.

U.S. Patent No. 4,848,977 is a related English language counterpart to EP0282090.

*Primary Examiner*—Andrea L. Pitts
*Assistant Examiner*—Mark Williams
*Attorney, Agent, or Firm*—John J. Prizzi

[57] ABSTRACT

An adjustable lead angle toolholder is disclosed for selectively cutting a workpiece at 30°, 45°, or 60° angles. The toolholder may have a rotatable, cylindrical endmill body that includes a radially-oriented wall or a stationary, square shank having a planar wall on its distal end. The toolholder further includes a cutting insert having at least one linear cutting edge, and a mounting assembly for pivotally mounting the insert onto the wall of the endmill body such that a lead angle of the linear cutting edge is adjustable with respect to the outer periphery of the toolholder body. The mounting assembly includes a plate-shaped insert holder, and a fastener for pivotally connecting the insert holder to the wall of the toolholder body. A locking screw secures the plate-shaped insert holder at a selected pivoted position on the wall of the toolholder body. The invention allows a single toolholder to cut or chamfer a workpiece at different angles.

19 Claims, 5 Drawing Sheets

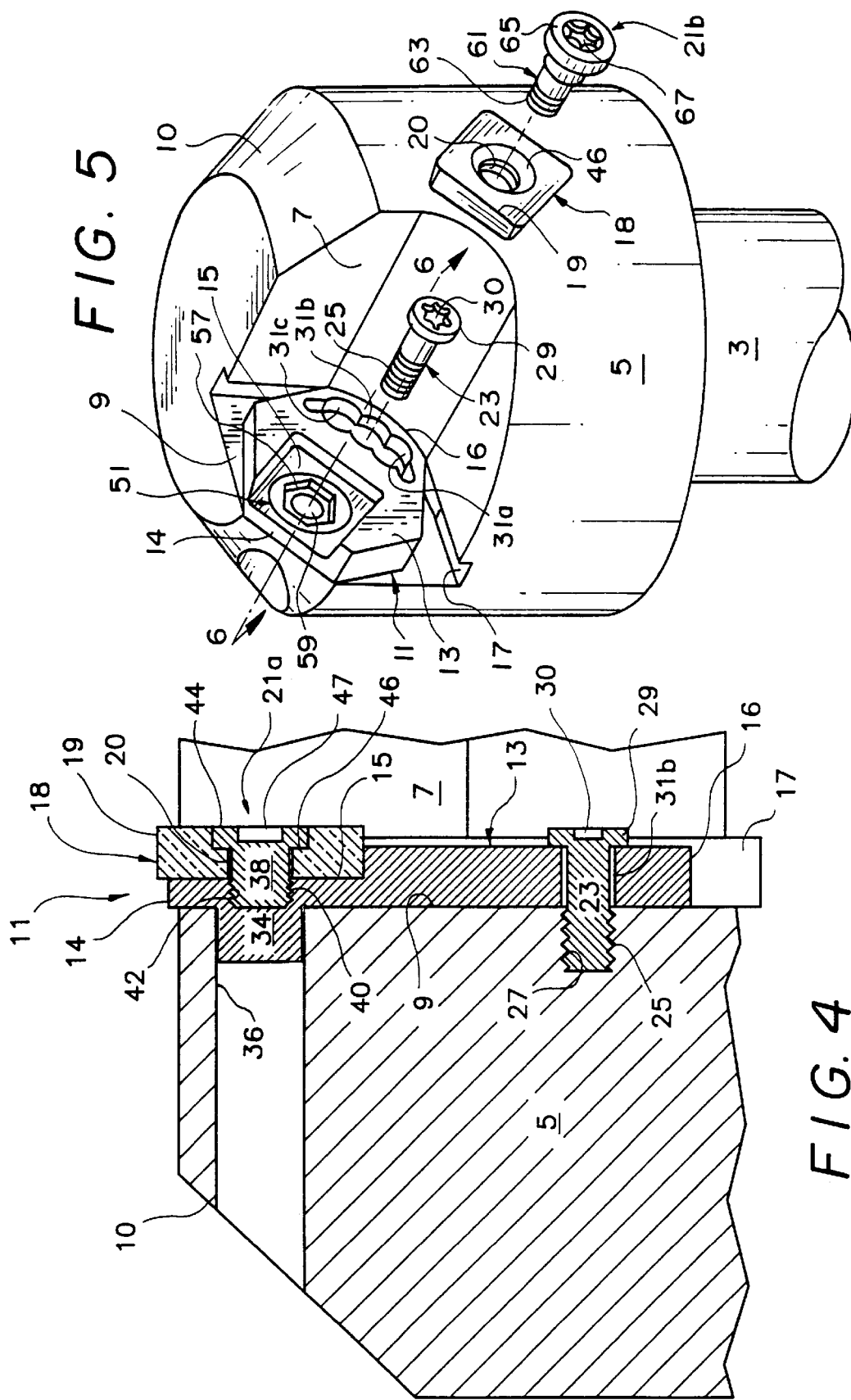

ADJUSTABLE LEAD ANGLE CHAMFERING TOOLHOLDER

BACKGROUND OF THE INVENTION

This invention generally relates to toolholders having an arrangement for adjusting the lead angle of an insert cutting edge, and is particularly concerned with a mounting assembly for pivotally mounting a cutting insert on either a cylindrical endmill body or a square shank toolholder.

Chamfering endmills are known in the prior art. Such endmills generally comprise a rotatable shaft, an endmill body having a radially-oriented wall, and a cutting insert secured into a pocket in the radially-oriented wall. The endmill body may terminate in a frusto-conical end, and the cutting insert may have a linear cutting edge that protrudes just over the frusto-conical end of the endmill body. The cutting edge of the insert is inclined at a desired chamfer angle with respect to the axis of rotation of the endmill which may be, for example, 45°. Such chamfering endmills are used to bevel the edges of bores, corners, or other sharp surfaces that are created in the course of a machining operation.

The fixed mounting of the cutting insert in such prior art chamfering endmills limits them to only a single chamfer angle when beveling the edges of a workpiece. However, machining operations often require the cutting of chamfers of different angles. For example, if the workpiece is a drain plate having a plurality of circular drain holes, the chamfer angle around the edges of each of the holes would preferably be 30° in order to render the promote draining. By contrast, in the case where the chamfer is used to guide one part of machinery into a tightly fitting orifice or opening, a chamfer angle of approximately 60° would be useful in facilitating the rapid alignment and mating of the two machine components.

In the past, the need for the creation of chamfer cuts of different angles has necessitated the use of separate endmills. However, for small machine shops, the necessity of acquiring and maintaining a variety of different endmills in order to produce chamfers of 30°, 45°, 60°, etc., places an undesirable burden on the financial resources of such shops. It also necessitates the changing of the chamfering endmill every time the machine operator desires to cut chamfers of different angles, thus adding to the time and effort necessary to complete a particular series of machining operations.

Clearly, there is a need for a single chamfering endmill that is capable of making chamfering cuts at a variety of angles in order to eliminate the need for maintaining a separate milling cutter for every angle of chamfer cut. Ideally, such a milling cutter could be adjusted to cut chamfers of different angles quickly and easily so as to minimize the time and effort necessary to complete the machining operation. Finally, such a milling cutter should be capable of accurately and rigidly holding its cutting insert at different chamfer angles in order to produce accurate and high quality chamfer cuts.

SUMMARY OF THE INVENTION

In its broadest sense, the invention is a toolholder, such as an endmill, having a pivotally mounted cutting insert that is capable of cutting a workpiece at any one of a plurality of discrete angles. The endmill of the invention generally comprises a rotatable shank, an endmill body connected to an end of the shank and having a substantially radially-oriented wall, a cutting insert having at least one linear cutting edge, and a mounting assembly for pivotally mounting the insert onto the radially-oriented wall of the endmill body. A locking screw secures the mounting assembly in a selected pivoted position in order to orient the linear cutting edge of the insert along a desired chamfer angle.

The mounting assembly includes a plate-shaped insert holder which has, at one end, a pocket for receiving a cutting insert. A fastener pivotally mounts the insert holder to the radially-oriented wall of the endmill body. A locking screw secures the plate-shaped member in a desired angular orientation with respect to the wall of the endmill body. The end of the plate-shaped member opposite from the insert is slidably mounted within a groove of the endmill body for further stability. In the preferred embodiment, the radially-oriented wall defines one side of a chip expulsion cavity formed in the endmill body.

The fastener that pivotally mounts the plate-shaped insert holder may assume one of two forms. In the first embodiment, the fastener includes a pin projecting from one side of the plate-shaped insert member that is receivable within a smooth bore located in the radially-oriented wall. An insert-securing screw extends through an aperture present in the center of the insert. The threaded shaft of the insert screw engages a threaded bore that extends through the plate-shaped insert holder in alignment with the pivot pin. In a second embodiment of the invention, the fastener includes a first screw that is extendable through a bore in the pocket of the plate-shaped insert holder. The first screw has an end that is threadedly engagable within a bore present in the radially-oriented wall of the endmill body. The bore in the plate-shaped member is counter-sunk so that the head of the first screw lies flush with or below the floor of the insert pocket. The fastener further includes a second screw extendable through an aperture in the insert whose threaded end is engagable with a threaded bore extending along the axis of rotation of the first screw. While the fastener of the second embodiment may require that the first screw be loosened before the plate-shaped insert holder may be pivotally adjusted on the radially-oriented wall, it more tightly secures the plate-shaped insert holder in a desired angular orientation with respect to the wall. In both embodiments, the locking screw that secures the plate-shaped insert holder in place is extendable through any one of three screw holes in the holder, each of which corresponds to a 30°, 45°, and 60° chamfer angle, respectively.

In operation, the locking screw is removed and the plate-shaped insert holder is pivoted into any one of the three desired chamfering angles by aligning one of the three openings in the plate with the registering, threaded bore in the radially-oriented wall of the endmill body. In the second embodiment of the invention, the first screw is loosened and tightened before and after the pivotal adjustment, respectively. The locking screw is then inserted through the bores and tightened.

While the invention finds particular utility when applied to an endmill, it is useful in toolholders in general. It may, for example, be used in conjunction with a stationary, square shank toolholder to provide cuts of different angles.

BRIEF DESCRIPTION OF THE SEVERAL FIGURES

FIG. 4 is a cross-sectional view of the endmill of FIG. 1 along the line 4—4, illustrating the details of the pivoting fastener and the lock screw;

FIG. 5 is an exploded view of a second embodiment of the endmill of the invention, illustrating an alternate "screw within a screw" type of fastener which may be used to pivotally connect the plate-shaped insert holder to the endmill body;

DETAILED DESCRIPTION OF THE PREFERRED EMBODIMENTS

Figure 1:
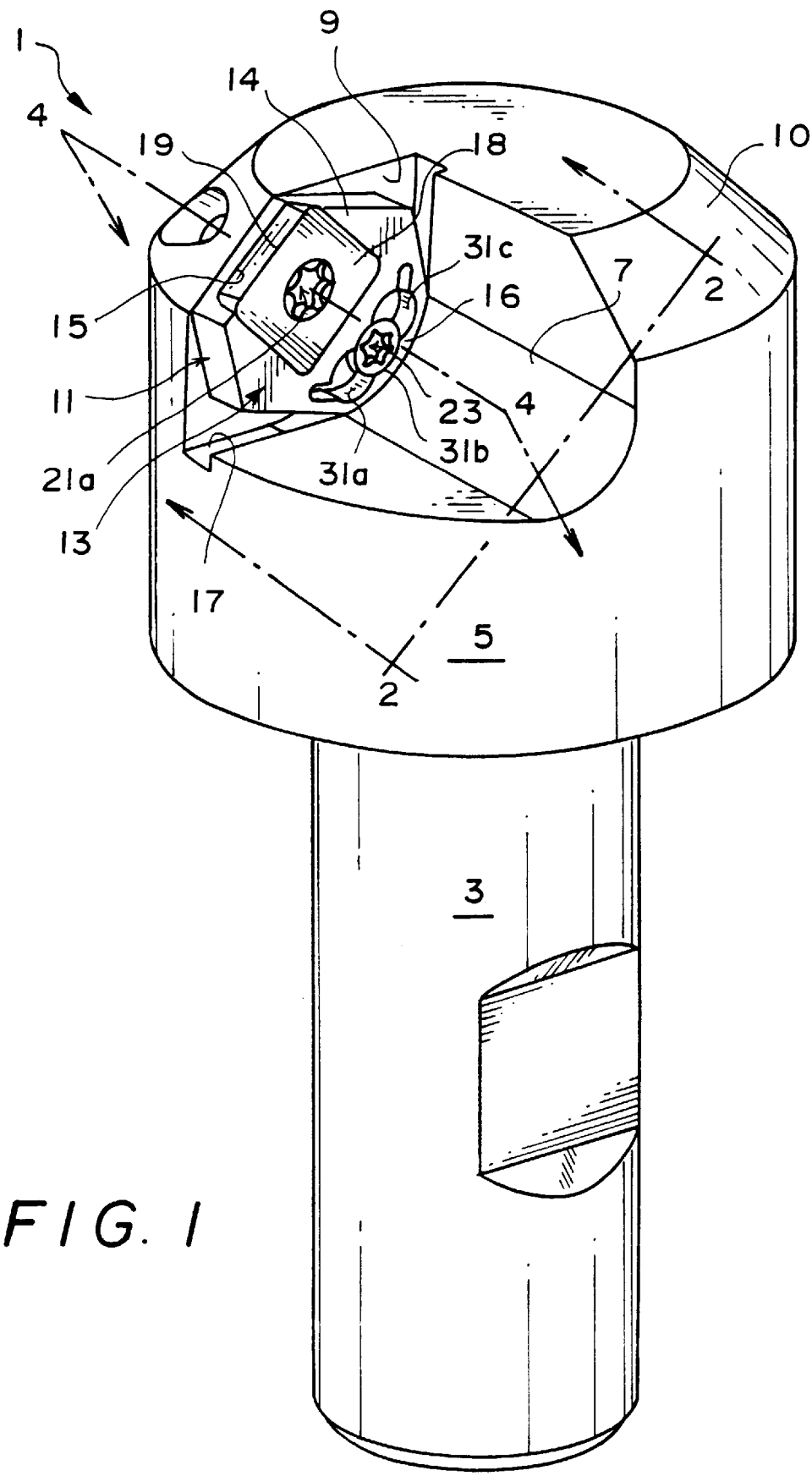
FIG. 1 is a perspective view of an endmill that incorporates the invention.

With reference now to FIG. 1, the invention may take the form of an adjustable lead angle endmill 1 that comprises a rotatable shank 3 connected at one end to a cylindrical endmill body 5. A chip expulsion cavity 7 is present at the top of the body 5, and is defined on one side by a flat, radially-oriented wall 9. The endmill body 5 terminates in a frusto-conical end 10 as shown.

A mounting assembly 11 for a cutting insert 18 is provided that includes a plate-shaped insert holder 13 which is pivotally mounted onto the radially-oriented wall 9 via fastener 21a. The insert holder 13 has a distal end 14 that includes a pocket 15 for receiving an insert 18. The insert holder 13 also includes a rounded, proximal end 16 slidably disposed within a guide groove 17 defined between the wall 9 and the chip expulsion cavity 7. An insert 18 having a linear cutting edge 19 is mounted in the pocket 15. The linear cutting edge 19 is disposed just above the frusto-conical end 10 of the endmill body 5. A bore 20 is present in the center of the insert 18 in order to admit an insert securing screw 38 of the pivoting fastener 21a. The purpose of the fastener 21a is to pivotally mount the plate-shaped insert holder 13 to the radially-oriented wall 9 while securing the insert 18 within the complementarily shaped pocket 15.

Figures 2, 3:
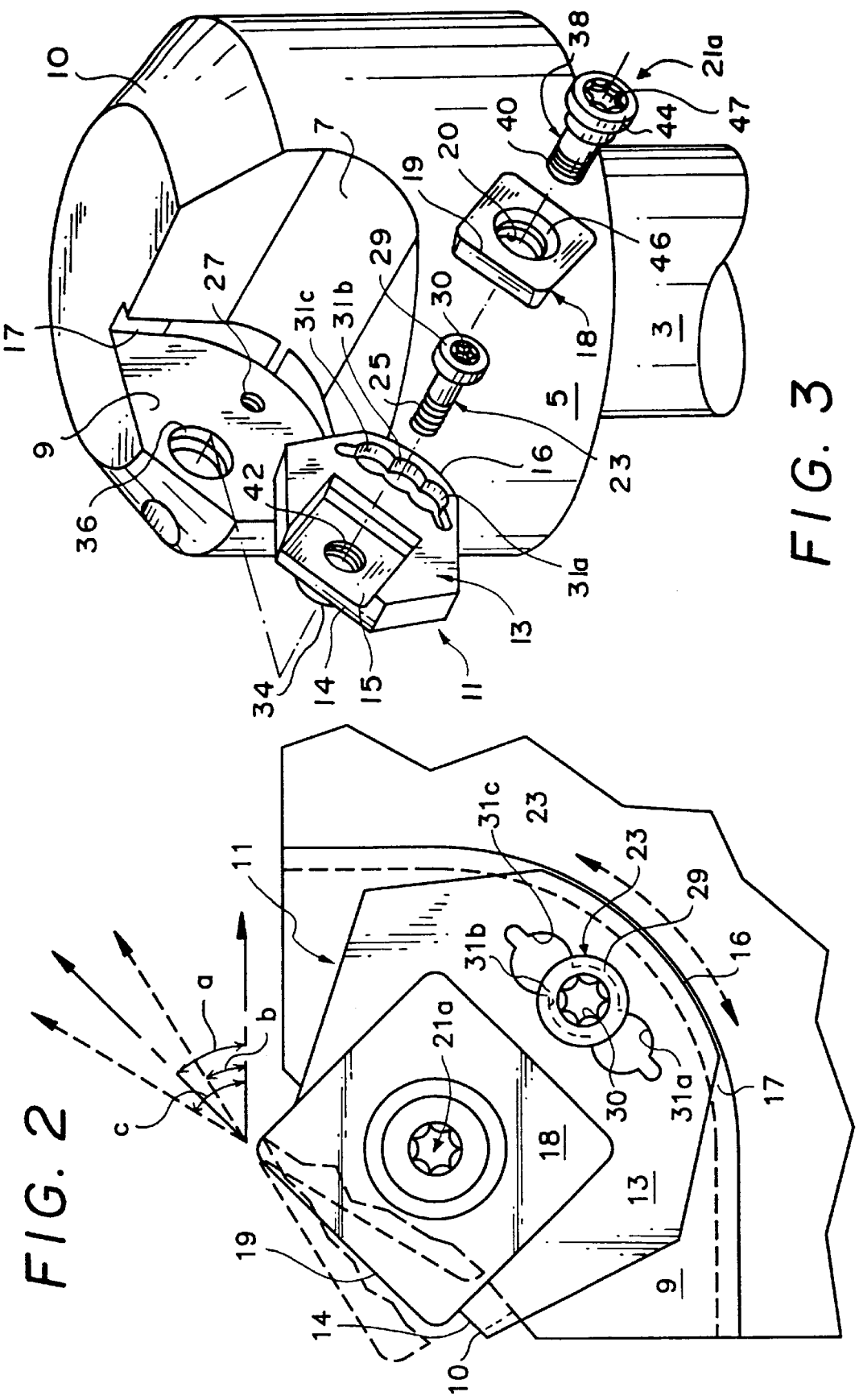
FIG. 2 is a partial side view of the endmill of FIG. 1 along the line 2—2.
FIG. 3 is an exploded view of the endmill of FIG. 1, illustrating in particular the component parts of the pivoting fastener used in the first embodiment.

With reference now to FIGS. 1, 2, and 3, a locking screw 23 is disposed opposite the insert 18 on the plate-shaped insert holder 13 in order to secure the plate-shaped insert holder 13 in a desired angular orientation. The locking screw 23 includes a threaded shank 25 that extends through one of three circular openings 31a–c in the plate 13 to engage a threaded bore 27 located in the radially-oriented wall 9. The locking screw 23 further includes a head 29 which engages a portion of the surface of the plate-shaped insert holder 13 surrounding one of the three openings 31a–c. In the center of the head 23 is a recess 30 for receiving a wrench or screwdriver.

With specific reference now to FIGS. 3 and 4, the pivoting fastener 21a of the first embodiment of the invention includes a pin 34 that projects out of the back side of the plate-shaped insert holder 13. Pin 34 is received within a closely fitting smooth bore 36 located in the cutter body 5. Preferably, the pin 34 is integrally formed with the plate-shaped member 13. The pin 34 allows the plate-shaped member 13 to pivotally rotate with respect to the radially-oriented wall 9 so that the lead angle of the linear cutting edge 19 of the insert 18 may be adjusted. Despite the pivotal movability that pin 34 affords, its close fit in the smooth bore 36, in combination with the clamping force that the locking screw 23 applies to the insert holder 13 is sufficient to secure the holder 13 during a cutting operation, since the forces applied to the holder via the insert 18 will tend to push the pin 34 into the bore 36. Fastener 21a further includes the previously referred to insert securing screw 38. Screw 38 has a threaded shank 40 extendable through the bore 20 of the insert 18 and engagable within a threaded bore 42 in the plate-shaped member 13. The insert securing screw 38 also includes a screw head 44 which is received within a counter-sunk recess 46 in the body of the insert 18.

Figure 6:
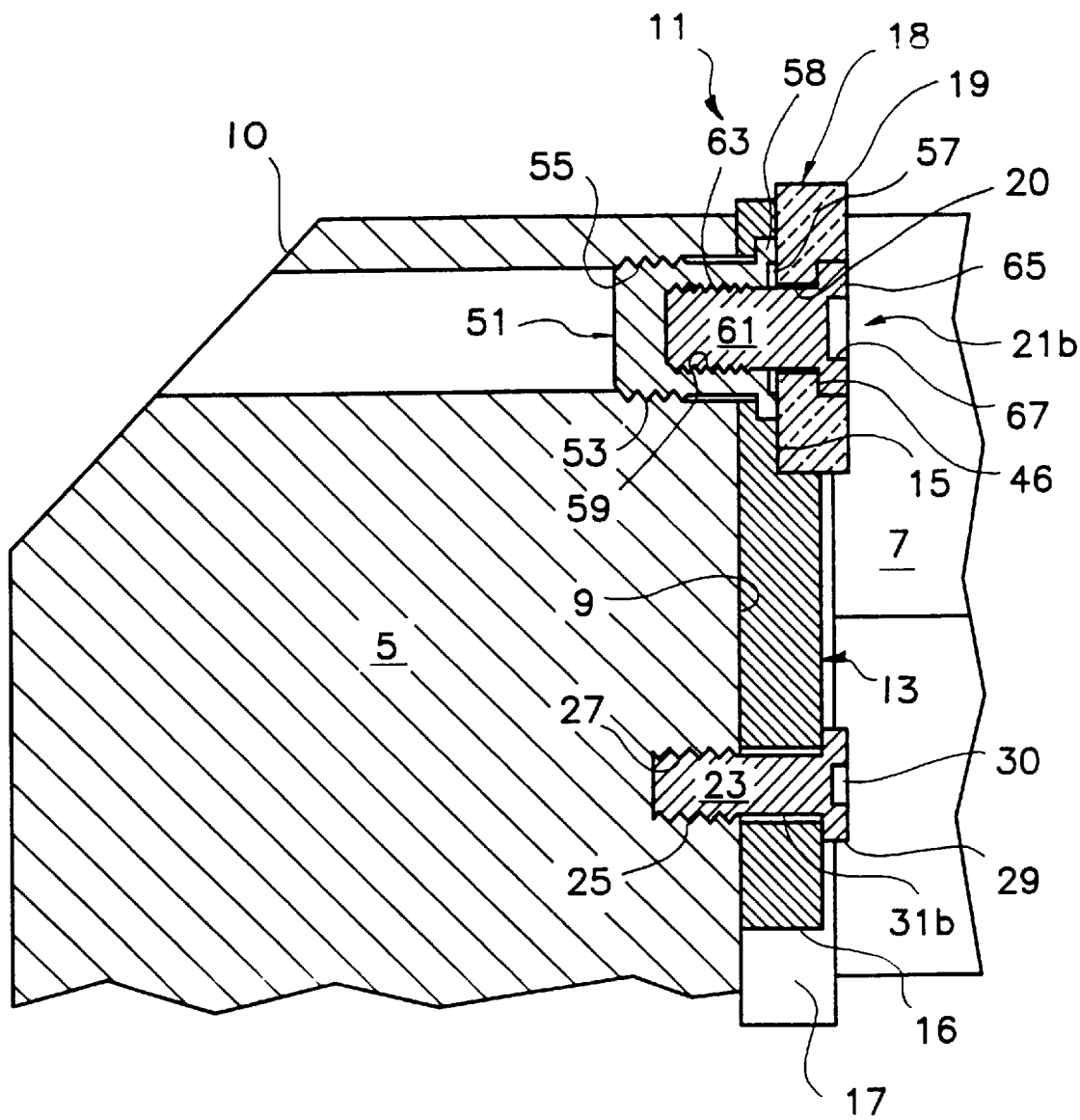
FIG. 6 is a cross-sectional view of the endmill of FIG. 5 in a fully assembled state along the line 6—6, illustrating the details of the fastener and locking screw.

With reference now to FIGS. 5 and 6, the pivoting fastener 21b of the second embodiment of the invention utilizes a pivot screw 51 instead of the previously-described pivot pin 34. Pivot screw 51 includes a threaded end 53 that is engagable within a screw hole 55 present in the endmill body 5. A recess 57, which may be hexagonal, is present in the head 58 of the pivot screw 51 so that a wrench may be used to tighten the plate-shaped insert holder 13 against the radially-oriented wall 9. A threaded bore 59 is provided along the axis of rotation of the shank of the pivot screw 51 as indicated. Like the previously-described pivoting fastener 21a, the fastener 21b includes an insert securing screw 61 that has a threaded shank 63 that extends through a bore 20 present in the center of the insert 18 and which is engagable within the previously-described threaded bore 59. Screw 61 likewise includes a screw head 65 which is receivable within a counter-sunk recess 67 present in the body of the insert 18.

In operation, the lead angle of the linear cutting edge 19 of the insert 18 is adjusted by removing the locking screw 23, and pivoting the plate-shape insert holder 13 to any one of three positions wherein one of the openings 31a–c aligns with threaded bore 27 in the wall 9. If the pivoting fastener 21b of the second embodiment is used, it will be necessary to loosen the pivot screw 51 before the insert holder 13 can be pivoted. In both embodiments, once the insert holder is pivoted to the desired position, locking screw 23 is then reinstalled and tightened. In the preferred embodiment, the centers of the three openings 31a–c are located along a circular arc as shown. As is specifically shown in FIG. 2, when the locking screw 23 is installed in the center opening 31b, the cutting edge 19 of the insert 18 is at angle "a " which corresponds to 45°. If, however, a chamfer angle of 30° or 60° is desired, the locking screw 23 is inserted through either opening 31a or 31c in order to adjust the angle of the linear cutting edge 19 to either angle "c" or angle "b". While three orientation angles have been discussed, it should be appreciated that fewer or more orientation angles are possible by providing fewer or more openings 31a–31c through the plate-shaped insert holder 13. Furthermore, while the angles 30°, 45°, and 60° have been discussed, the openings may be positioned to provide any angles within the range of rotation of the plate-shaped insert holder 13.

As is evident from the foregoing description, the lead angle of the cutting edge 19 may be quickly and easily adjusted by means of the single locking screw 23. Moreover, in view of the securing force applied to the plate-shaped insert holder 13 via either one of the pivoting fasteners 21a,b, the locking screw 23 and the guide groove 17, the insert 18 is sufficiently rigidly secured to the cylindrical endmill body 5 so as to create a smooth and accurate chamfer in a workpiece.

Figure 7:
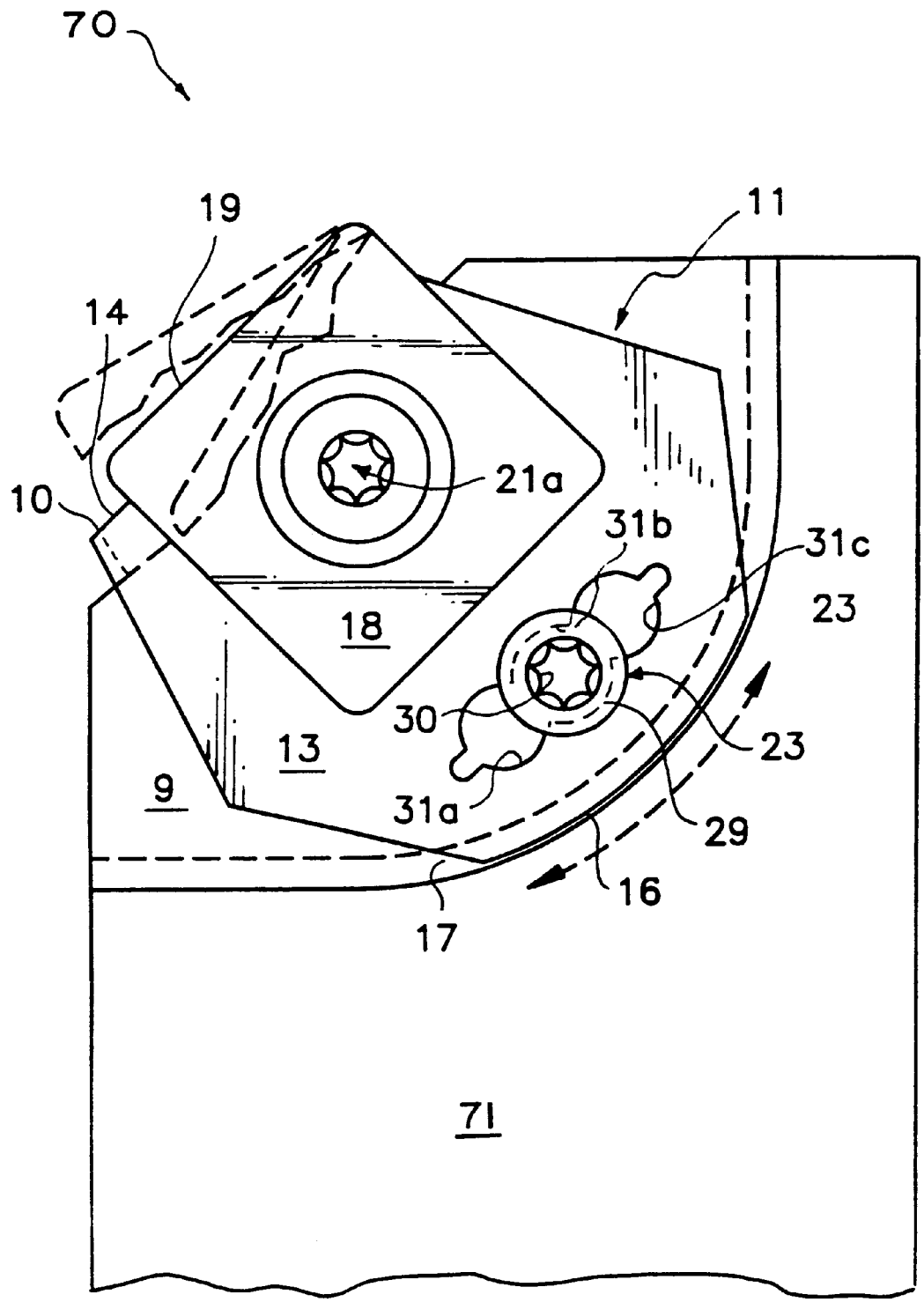
FIG. 7 is a plan view of the invention as applied to a stationary, square shank toolholder.

The invention may also be applied to a stationary toolholder, and an example of such a toolholder embodiment 70 is illustrated in FIG. 7. In this embodiment 70, the pivotal mounting assembly 11 and all components thereof remain the same, while the only difference is the assembly 11 mounted in a peripherally-oriented wall 9 of a square shank 3, which is stationary, that forms the toolholder body 71.

While the pivoting fastener 21a is the same one used in the first-described embodiment of the invention, it may just as easily be the fastener 21b used in the second embodiment. Just as in the previously-described embodiment 1, the pivotal mounting assembly 11 allows the linear cutting edge 19 of the insert 18 to be oriented at any one of three specific angles with respect to the upper edge of the body 71 of the toolholder.

While this invention has been described with respect to two embodiments, various equivalences, additions, modifications, and revisions will become evident to persons skilled in the art. All such equivalences, modifications, revisions, and additions are intended to be encompassed within the scope of this patent, which is limited only by the claims appended hereto.

What is claimed is:

1. An adjustable lead angle toolholder, comprising:
   a toolholder body having a substantially planar wall;
   a cutting insert having a body with a linear cutting edge;
   means for pivotally mounting the insert onto the wall of the toolholder body such that a lead angle of the linear cutting edge is angularly adjustable with respect to an outer periphery of the toolholder body,
   wherein the pivotal mounting means includes a discrete insert holder within the toolholder body and wherein the insert holder hsa a pocket on one side for receiving the body of the insert and wherein the pivoted mounting means further includes a fastener that is received within a bore in the wall of the toolholder body to pivotally connect the insert and insert holder to the wall of the body, and
   means for securing the insert in a selected pivoted position so that the linear cutting edge is oriented at a desired angle with respect to the periphery of the toolholder body.

2. The adjustable lead angle toolholder of claim 1, wherein the fastener includes a pin that is received within a smooth bore in the wall, and a screw for securing the insert into the pocket of the insert holder.

3. The adjustable lead angle toolholder of claim 1, wherein the fastener inculdes a first screw having a threaded end engagable within a threaded bore in the wall for pivotally mounting the insert holder, and a second screw having a threaded end engagable within a threaded bore in the first screw for securing the insert within the pocket of the insert holder.

4. The adjustable lead angle toolholder of claim 1, wherein the toolholder body includes a groove adjacent to the wall for slidably retaining an edge of the insert holder.

5. The adjustable lead angle toolholder of claim 4, wherein the toolholder body is a stationary shank and wherein the wall is radially-oriented and coplanar with a top surface of the shank.

6. The adjustable lead angle toolholder of claim 1, wherein the securing means includes a locking screw that extends through an opening in the insert holder.

7. The adjustable lead angle toolholder of claim 6, wherein the securing means includes a plurality of openings in the insert holder for securing the insert holder in a plurality of discrete pivotal positions, each of which results in a different lead angle of the linear cutting edge of the insert.

8. The adjustable lead angle toolholder of claim 1, wherein the toolholder body is a rotatable, cylindrical endmill body and the wall is radially oriented with respect to the cylindrical body.

9. An adjustable lead angle endmill having a rotatable shank, comprising:
   an endmill body connected to an end of the shank and having a substantially radially-oriented wall;
   a cutting insert having a body with a linear cutting edge;
   a mounting assembly for pivotally mounting the insert onto the wall of the endmill body such that a lead angle of the linear cutting edge is angularly adjustable with respect to an outer periphery of the endmill body wherein the mounting assembly includes a discrete insert holder within the toolholder body, the insert holder has a pocket on one side for receiving the body of the insert, and wherein the mounting assembly further includes a fastener that is received within a bore in the wall of the toolholder body to pivotally connect the insert and insert holder to the wall of the body, and
   a locking screw for securing the insert in a selected pivoted position with respect to the wall of the toolholder body.

10. An adjustable lead angle toolholder, comprising:
    a toolholder body having a distal end that includes a planar wall;
    a cutting insert having a body with a linear cutting edge;
    means for pivotally mounting the insert onto the wall of the toolholder body such that a lead angle of the linear cutting edge is angularly adjustable with respect to an outer periphery of the body, including a discrete insert holder within the toolholder body, wherein the insert holder has a pocket on one side for receiving the body of the insert, and a fastener for pivotally connecting the insert holder to the wall; and
    a lock screw for securing the insert holder in a selected pivoted position such that the linear cutting edge of the insert assumes a desired angular orientation with respect to the outer periphery of the toolholder body.

11. The adjustable lead angle toolholder of claim 10, wherein both the insert body and the insert holder include bores that register when the insert is received within the pocket, and wherein the fastener includes a screw that extends though the bores to secure the insert into the pocket of the insert holder.

12. The adjustable lead angle toolholder of claim 11, wherein the fastener includes a pin that extends into a smooth bore in the wall.

13. The adjustable lead angle toolholder of claim 11, wherein the fastener includes a first screw having a threaded end engagable within a threaded bore in the wall for pivotally mounting the insert holder, and a second screw having a threaded end engagable within a threaded bore in the first screw for securing the insert within the pocket of the insert holder.

14. The adjustable lead angle toolholder of claim 10, wherein the insert holder is formed from a plate-shaped member having two opposing flat sides, one of which slidably engages the planar wall of the toolholder body.

15. The adjustable lead angle toolholder of claim 14, wherein the toolholder body includes a groove adjacent to the wall for slidably retaining an edge of the insert holder that is opposite from the linear cutting edge of the insert disposed in the pocket.

16. The adjustable lead angle toolholder of claim 10, wherein the body includes a rotatable, cylindrical endmill body having a chip expulsion cavity adjacent the wall, and wherein the wall is radially oriented.

17. The adjustable lead angle toolholder of claim 10, wherein the locking screw extends through an opening in the insert holder and threadedly engages a bore located in the wall of the body.

18. The adjustable lead angle toolholder of claim 17, wherein the insert holder includes a plurality of openings for receiving the locking screw.

19. An adjustable lead angle toolholder, comprising:
- a toolholder body having a distal end that includes a radially-oriented, planar wall;
- a cutting insert having a body with a linear cutting edge;
- a mounting assembly for pivotally mounting the insert onto the planar wall of the toolholder body such that a lead angle of the linear cutting edge is angularly adjustable with respect to an outer periphery of the distal end of the body, including an insert holder having a pocket on one side for receiving the body of the insert, and a fastener for pivotally connecting the insert holder to the wall; and
- a lock screw for securing the insert holder in a selected pivoted position such that the linear cutting edge of the insert assumes a desired angular orientation with respect to the outer periphery of the toolholder body.

\* \* \* \* \*